United States Patent [19]
Prestridge

[11] 3,849,285
[45] Nov. 19, 1974

[54] ELECTRIC CONTROL SYSTEM
[75] Inventor: Floyd Leon Prestridge, Tulsa, Okla.
[73] Assignee: Combustion Engineering, Inc., New York, N.Y.
[22] Filed: Sept. 15, 1972
[21] Appl. No.: 289,716

[52] U.S. Cl. ................................ 204/305, 204/306
[51] Int. Cl. ............................................. B03c 5/02
[58] Field of Search ............ 204/306, 305, 189, 190

[56] References Cited
UNITED STATES PATENTS
| | | | |
|---|---|---|---|
| 1,276,386 | 8/1918 | McKibben | 204/306 |
| 1,405,120 | 1/1922 | Harris | 204/306 |
| 1,555,231 | 10/1925 | Skaer | 204/306 |
| 3,148,133 | 9/1964 | Turner | 204/306 |

Primary Examiner—T. M. Tufariello
Attorney, Agent, or Firm—Arthur L. Wade

[57] ABSTRACT

An electric treater for oil field emulsions is disclosed with the power system for its electrode system a dominant feature in containing a fluid portion between the electrodes of variable conductivity. The variability of conduction is disclosed as either detected and manifested as a guide to operation or utilized to control the oil-water interface within the treater without drawing an overload of power.

2 Claims, 2 Drawing Figures

ELECTRIC CONTROL SYSTEM

BACKGROUND OF THE INVENTION

1. Field of the Invention

The present invention relates to the control of the generation of electrostatic fields through which a mixture of water and oil is flowed for exposure to the fields as a force for coalescing droplets of the water into sizes great enough for their effective gravitation from the oil. More particularly, the invention relates to regulating the conductivity of the circuit formed between an electrode system suspended in the mixture generating the fields and the body of water formed by the coalesced water droplets.

2. Description of the Prior Art

The prior art has been consistently concerned with direct control of the power applied to the circuits of the electric treaters. Internal reactance has been used to shape the power curves of transformers. Controllers have sensed the load current and applied the power source to the circuits to keep the current demand within predetermined limits. Overload devices, circuit breakers and other direct limiting means available have been applied to directly control the power.

No worker in the art has attacked the problem of power control by regulation of the conductivity of the circuit between the treater electrodes. No worker has controlled the length of this path, controlled the interface level within the treater, or utilized the conductivity of the path as an indication of the water dispersed in the oil. It is these control and utilization problems solved by the present invention.

This application is one of a series based on inventions made during extensive investigation of the more severe present service of electric treaters of oil field emulsions. The disclosures of U.S. application Ser. No. 197,400 filed Nov. 10, 1971, now U.S. Pat. No. 3,772,180 by Floyd L. Prestridge and U.S. application Ser. No. 244,394 filed Apr. 17, 1972 by Floyd L. Prestridge and Harry G. Wallace overlap to some extent in delineating the extensive background art of electric treating. Little of this background need be repeated here to disclose the concept of the present invention. The first application is directed to the invention required to provide a unique form of electrostatic field. The second application is directed to the invention required to sense the power demand of a varying electrical load of an electric treater and directly control the application of a source of electrical power to meet the demand. The present invention is also related to control of power to varying loads as represented by electric treaters. The background of how these fields are applied in breaking oil field emulsions is helpful to understanding the present invention, but the control of power which generates these fields has taken an entirely new direction unique to this art.

SUMMARY OF THE INVENTION

An object of the invention is to manifest the controlled change of conductivity of a fluid portion of a circuit connected to a power source.

Another object is to change the length of a fluid portion of a circuit connected to a power source to alter the conductivity of that fluid portion.

Another object is to change the length of the fluid portion of the circuit of an electric treater by changing the distance between the electrode and the water surface.

Another object is to regulate the conductivity of the fluid portion of the circuit of an electric treater by changing the electrical characteristics of the fluid portion and manifesting the conductivity variation as the fluctuation of the amount of water in the emulsion.

The invention contemplates instumentation connected to a circuit which connects a power source to a circuit so as to manifest the power drawn by the circuit while the conductivity of a fluid portion of the circuit is changed.

The invention also contemplates the fluid portion changing in conductivity caused by the change in the length of the fluid portion.

The invention more specifically contemplates the liquid portion of the circuit being the emulsion of an electric treater between the electrode of the treater and the surface of the lower body of collected water, this distance being varied by control of the water withdrawn from the body of collected water.

The invention also contemplates maintaining the level of water constant beneath the electrode and keeping either the thermal program or the chemical program constant while the effect on the electrical characteristics of the fluid between the electrode and water surface is manifested by the current flowing in the circuit connected to power terminals.

Other objects, advantages and features of this invention will become apparent to one skilled in the art upon consideration of the written specification, appended claims, and attached drawings, wherein;

FIG. 1 is a somewhat diagrammatic elevation of an electric treater for oil field emulsion embodying the present invention; and FIG. 2 is similar to FIG. 1 but disclosing several alternate forms of various control sub-systems of the overall system.

DESCRIPTION OF THE PREFERRED EMBODIMENT

Figure 1:
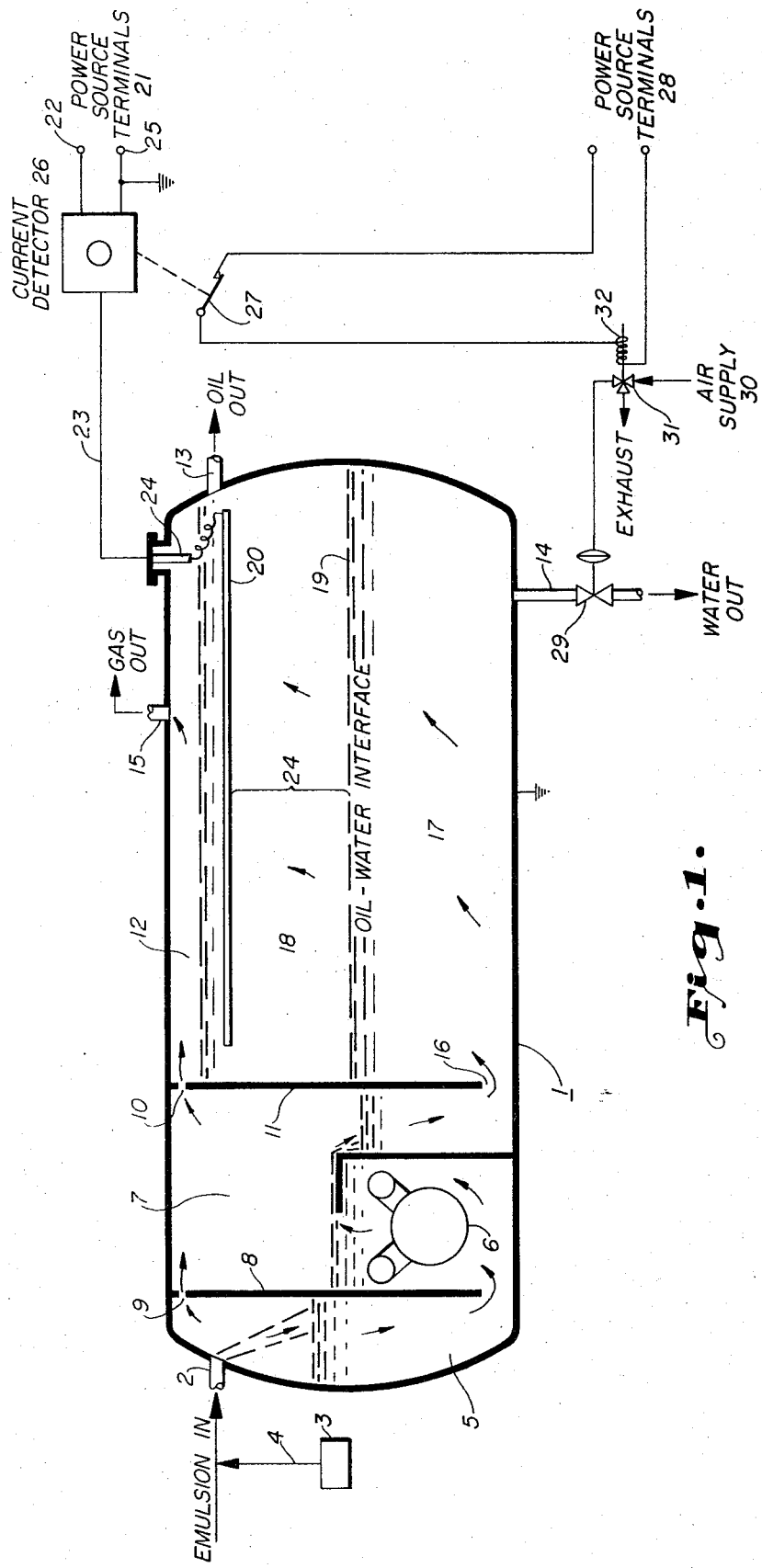

Referring to FIG. 1, the basic structure and arrangement of a horizontal form of electric treater, or demulsifier, of oil field emulsions is shown. As it usual, the basic shell 1 is shown, shorn of the structural detail which does not contribute to disclosure of the invention.

The fluids to be processed enter the shell 1 through a conduit 2. There may be chemicals added to the fluids upstream of shell 2. A chemical supply 3 is indicated as supplying chemicals to the fluids through a conduit 4.

The fluids of oil field production usually comprise some proportion of oil, water and gas. The proportions can vary greatly. However, assuming there is a significant amount of all three of these basic components mixed intimately with each other, shell 1 will have an initial compartment 5 in which residence time is provided for some degree of separation of the liquids from the gas. Many and varied structures can be provided in compartment 5 to encourage, or promote, this gas-liquid separation. However, it is not the purpose of this disclosure to dwell on this feature of the treater or the process carried out in the shell 1. If separation is required, it is provided in this initial volume of the shell.

After separation, there is usually provided some thermal input to the processed fluids. The heat may be also introduced into compartment 5 to help in separation. However, a heater 6 is shown as mounted in a downstream compartment 7.

Gas may be disengaged from the liquids in both compartments 5 and compartment 7. Such gas as is separated in the compartments is provided a path through partition 8 by aperture 9. If additional gas is separated from the fluids in heated compartment 7, it can join the gas of compartment 5 and flow through aperture 10 in partition 11.

Again, the baffling and heating arrangement within compartment 7 may be varied. There are many designs whose creators hoped would be the most efficient in bringing the liquids to the desired temperature and disengage the gas therefrom. The invention simply is not primarily concerned with these arrangements despite their close association and effect upon the invention. They are related to the invention in that their efficiency will be manifested by the invention under conditions discussed in connection with the invention subsequently. However, the basic nature of the invention emerges as the mixture of oil and water flows from compartment 7 and into compartment 12. It is in 12 that the peculiar and specific association of the water and oil is processed by the invention. These fluids are separated from each other by the forces of an electrostatic field and gravity so that the lighter oil is drawn from shell 1 through upper conduit 13 and the heavier water is drawn through lower conduit 14. The gas flows along the top of compartment 12 and is drawn up and out of the shell through conduit 15.

As the oil and water mixture flows into compartment 12 through the opening 16, it may be distributed by any number of structures, none of which is shown here. Again, these variations of distributor structure are well known in the art and need not be given specific form to disclose the invention.

In general, the oil-water mixture is distributed along the lower portion of compartment 12 and heavier water droplets are urged by gravity to descend while the oil phase begins to rise. The lower collection of water forms a body 17 while the oil, with water droplets mixed with oil into an emulsion, forms above the water body in a body 18, forming an interface 19 between them.

This completes what might be called the mechanical and hydraulic features of the treater disclosure before disclosing the electrical freatures which generate an electrostatic field in the compartment 12. The function of electrostatic fields in this type of process is generally well known. Within these fields water droplets are driven together, they are coalesced, into larger and larger droplets upon which gravity acts to pull the droplets down to join the water body 17.

The more simple form of electrodes between which the electrostatic field is generated is disclosed as electrode 20 supported in compartment 12 a distance above the interface 19. Between the two electrodes, 19, 20, the electrostatic field is generated when electrical power is supplied the electrodes. A circuit, including the electrodes, is formed with power source terminals 21. More specifically, hot terminal 22 is connected to line 23 which is extended through a bushing 24 and connected to electrode 20.

The fluids between electrode 20 and interface 19 form a conductive path 24. As the water body 17 is the second electrode, it is grounded to complete the circuit to terminal 25. Thus, the circuit is completed, including portion 24 which is variably conductive, depending upon the physical and chemical characteristics of the fluids in the path.

The power demanded by the load varies. If the interface 19 rises, the shortening of path 24 increases its conductivity or decreases its restivity. The power drawn from the power source terminals increases.

If the conductive water content of the fluids in path 24 increases or its restivity decreases, the power increases. If the temperature of the fluids changes, the conductivity of the fluids changes. In short, the physical and chemical characteristics of the fluids determine the conductivity of the fluids and the conductivity of the fluids determines the power drawn by the circuit from power source terminals 21.

There are various ways to measure the power demanded by the circuit. In FIG. 1, a current detector 26 is disclosed. This device is connected in the circuit and manifests the current, specifically, as an indication of the power demand. It is relatively simple to also provide a switch 27 as a mechanical means of manifesting a predetermined level of the power sensed by detector 26. Switch 27 can then be incorporated into a circuit powered by power source terminals 28 to exert a control function.

In FIG. 1, the specific control function disclosed is regulation of the level 19. Water is drawn from the body 17 through conduit 14 under the control of valve 29. Valve 29 is opened and closed by a combination of a spring, not shown, and fluid pressure from a supply 30. Briefly, the fluid pressure supply is applied to valve 29 through a valve 31 which, in turn, is actuated by a solenoid 32 energized by the circuit of switch 27.

The function of this system is to manifest and/or regulate the interface 19 to maintain the electrostatic fields which coalesce the water from the oil in shell compartment 12. While maintaining the electrostatic fields efficient, the invention of the system prevents power drawn which would damage the components of the electrical circuit.

If the current reaches a predetermined maximum level, the liquid portion 24 of the circuit is lengthened and thereby rendered less conductive to reduce the current flow in the circuit. The detector 26 actuates switch 27 which energizes solenoid 32. Solenoid 32 actuates valve 31 to place the fluid pressure on valve 29 to drain water from body 17 and lower interface 19.

In its more simple form, the invention is embodied in a system wherein the varying electrical power load of a circuit is a portion comprising fluids having variable conductivity. The load is producing a work function and is dependent upon the varying conductivity of the fluids. The power drawn by the circuit is manifested, either as a guide for controlling the conductivity of the fluid portion of the circuit or as information on the influence upon the conductivity of the fluid circuit portion of upstream means altering the conductivity of the fluids.

Figure 2:
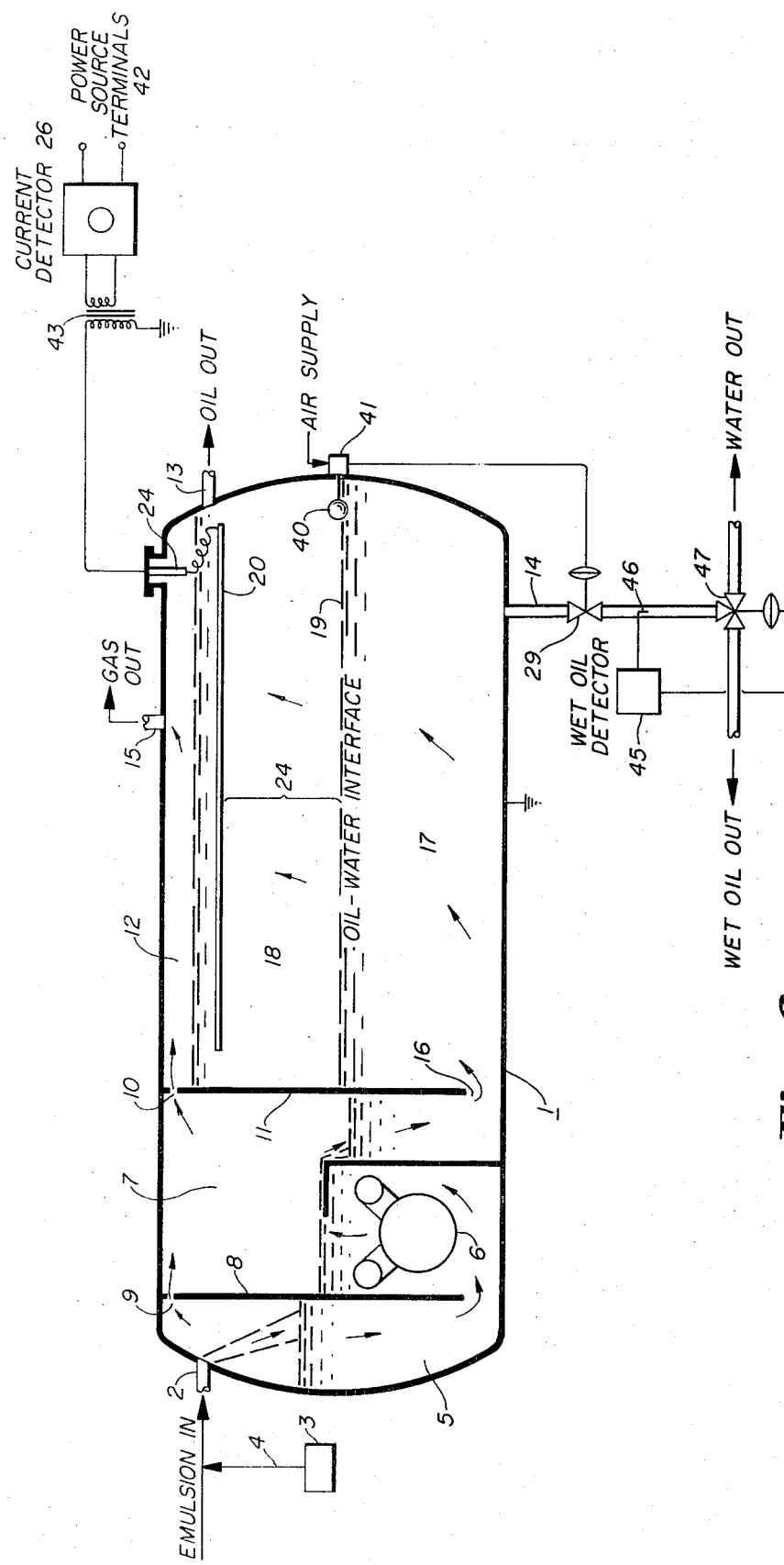

FIG. 2 discloses an extension of the basic concepts of the invention. It also serves to demonstrate other forms of the power source so that it will be demonstrated how the invention is not to be limited in the form of power source.

The mechanics and hydraulics of the treater of FIG. 1 are duplicated in FIG. 2 except that oil-water interface level is sensed directly by a float 40 which actuates a transducer mechanism 41 to establish a control fluid pressure for valve 29.

Also, the power for the circuit is specifically a.c. Power source terminals 42 supply a.c. voltage to transformer 43. However, the a.c. voltage of the secondary of transformer 43 supplies the power to electrode 20 which generates an electrostatic field capable of the desired coalescing of water droplets in the oil. This FIG. 2 merely nails it down definitely that a.c. voltage is specifically satisfactory for the purpose of the invention.

The primary story that the FIG. 2 disclosure delivers is that the interface 19 may be held constant by means such as 40,41 isolated from the electrical circuit. Then, the electrical circuit manifests the conductivity change in liquid portion 24 in terms of other upstream factors affecting conductivity.

Two factors which may influence conductivity of fluid circuit portion 24 are disclosed on both FIGS. There may well be others, but the heat of firetube 6 and the chemical of source 3 are two and serve to demonstrate the present teachings adequately.

When level 19 is maintained, one of the upstream factors of conductivity may be changed. The resulting effect on conductivity of 24 manifests itself through detector 26. The change in power can then be calibrated in terms of the upstream factor variation.

It is apparent that the effect of the chemical program with source 3 will show up on detector 26. This information could be a useful guide in establishing an optimum chemical program for the particular production being processed.

Perhaps less apparent is the fact that after man-made attempts to keep a consistent chemical program, and thermal program, the many imponderables of such process will cause the water "cut", or amount, of the produced oil to vary and approach the level of unacceptability. The detector 26 then becomes a useful indication of the "cut" and may be used in control. This control could be to direct the oil with the bad "cut" to another process for further treatment or to recycle it in the present process until satisfactorily brought under control.

This contemplation of the cut getting out of a satisfactory range of values also brings up the possibility of the interface 19 rising so high, despite control actions taken, that water goes out with the oil through conduit 13. On the other hand, interface 19 may sink so low as to send oil out the water conduit 29. These emergency conditions may be developed in both the system of FIG. 1 as well as the system of FIG. 2.

In FIG. 2, a detector is disclosed as connected to conduit 14 so as to determine if oil has reached the bottom of shell 1 and is going out conduit 14. Detector 45 is connected to a probe 46 which is inserted directly into conduit 14 as a primary element sensing the composition of the fluids in conduit 14.

Detector 45 is readily arranged to develop a control signal, which can be placed on valve 47. Valve 47 is disclosed as manually positioned to route the water of conduit 14 to conduit 47. When the signal for oil is developed by detector 45, valve 47 is positioned to its alternate position to route the oil to a storage capacity or recycle it through the treater. The important result is that the oil is not lost or a contaminant of the discharged water.

Detecting the interface of water and oil in emulsion treaters has always been a touchy business. On paper, a float designed with the buoyancy to float on the water looks good. In practice, the interface is often a fuzzy collection of material which fades into the water below and the oil above. Oil field emulsion may be contaminated with a wide variety of extraneous substances. The simple float may be coated with paraffin or sand and respond sluggishly to the changes of interface elevation.

Other primary elements have been tried. Conductivity probes do not give a reliable signal in the presence of the electrostatic field of electric treaters. It was during long hours of struggle with various detection systems that the inventor began to monitor the power to the electrodes of electric treaters and correlate this power with the interface location. Suddenly, the perspective of the applicant enlarged until he realized that the power drawn by the circuit, including the liquid path between the electrode and water, was a reliable index for control of the water discharged from the treater to regulate the interface. From this point it followed that the conductivity of the liquid path between the electrode and water was not simply dependent upon its length. Variation of the water content of the liquids and their temperature caused the conductivity to change. If all but one of these variables could be maintained substantially constant, the power drawn by the circuit could be calibrated in terms of the one variable. Therefore, the control guided by power demand of the circuit reaches beyond simple interface regulation.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system is adapted to supplying power to an electric treater of oil field emulsions, including,
    a pair of electrical power source terminals,
    a circuit connected to the terminals and adapted to include a portion comprising the fluid oil-water mixture of an emulsion,
    means connected to the circuit to manifest the power applied to the circuit,
    means maintaining a predetermined length for the circuit portion between the terminals,
    and means varying the electrical conductivity of the portion of the circuit, comprising a control system for regulating chemical injected into the emulsion, which chemical affects the electrical conductivity of the emulsion of the circuit portion.

2. A system is adapted to supplying power to an electric treater of oil field emulsions, including, a pair of electrical power source terminals, a circuit connected to the terminals and adapted to include a portion comprising the fluid oil-water mixture of an emulsion, means connected to the circuit to manifest the power applied to the circuit, means maintaining a predetermined length for the circuit portion between the terminals, and means varying the electrical conductivity of the portion of the circuit, comprising a control system for regulating the heating of the emulsion, which temperature change affects the electrical conductivity of the emulsion of the circuit portion.

* * * * *